United States Patent [19]

Bedekovic et al.

[11] Patent Number: 4,705,776
[45] Date of Patent: Nov. 10, 1987

[54] RECORDING MATERIAL CONTAINING CHROMOGENIC 3,3-BISINDOLYL-4-AZAPHTHALIDES

[75] Inventors: Davor Bedekovic, Therwil; Ian J. Fletcher, Magden, both of Switzerland

[73] Assignee: Ciba-Geigy Corporation, Ardsley, N.Y.

[21] Appl. No.: 808,990

[22] Filed: Dec. 16, 1985

Related U.S. Application Data

[62] Division of Ser. No. 605,948, May 1, 1984, Pat. No. 4,587,343.

[30] Foreign Application Priority Data

May 9, 1983 [CH] Switzerland ................... 2524/83

[51] Int. Cl.$^4$ ................... B41M 5/16; B41M 5/18; B41M 5/22
[52] U.S. Cl. ................... 503/220; 427/151; 503/223; 503/226
[58] Field of Search ................... 346/220, 223, 226; 427/151; 546/116

[56] References Cited

U.S. PATENT DOCUMENTS 3,775,424 11/1973 Farber ................... 546/116
3,916,070 10/1975 Ozutsumi et al. ................... 346/218
4,102,893 7/1978 Garner et al. ................... 548/456
4,232,887 11/1980 Becker et al. ................... 346/223
4,242,513 12/1980 Hoover et al. ................... 346/223
4,275,206 6/1981 Becker et al. ................... 346/223

FOREIGN PATENT DOCUMENTS 054277 6/1982 European Pat. Off. ................... 346/226
0120495 7/1982 Japan ................... 346/220

Primary Examiner—Bruce H. Hess

Attorney, Agent, or Firm—Edward McC. Roberts; Meredith C. Findlay

[57] ABSTRACT

The invention relates to chromogenic 3,3-bisindolyl-4-azaphthalides of the general formula

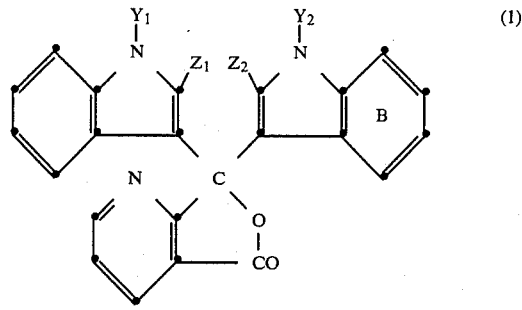

wherein
$Y_1$ is hydrogen, $C_1$–$C_{12}$alkyl which is unsubstituted or substituted by halogen, hydroxyl, cyano or lower alkoxy, or is $C_1$–$C_{12}$acyl, benzyl or benzyl substituted halogen, nitro, lower alkyl or lower alkoxy,
$Y_2$ is $C_5$–$C_{12}$alkyl, preferably $C_6$–$C_9$alkyl, which is unsubstituted or substituted by halogen, hydroxyl, cyano or lower alkoxy, and
$Z_1$ and $Z_2$, each independently of the other, are hydrogen, lower alkyl or phenyl, and the rings A and B, each independently of the other, are unsubstituted or substituted by halogen, nitro, cyano, lower alkyl, lower alkoxy, lower alkoxycarbonyl, amino, mono-lower alkylamino or di-lower alkylamino.

These compounds are particularly suitable for use as color formers in pressure-sensitive or heat-sensitive recording materials and produce fast, strong red or violet colorations.

6 Claims, No Drawings

RECORDING MATERIAL CONTAINING CHROMOGENIC 3,3-BISINDOLYL-4-AZAPHTHALIDES

This is a divisional of application Ser. No. 605,948 filed on May 1, 1984, now U.S. Pat. No. 4,587,343, issued May 6, 1986.

The present invention relates to chromogenic 3,3-bisindolyl-4-azaphthalides, to the preparation thereof and to the use thereof as colour formers in pressure-sensitive or heat-sensitive recording materials.

The 3,3-bisindolyl-4-azaphthalides have the general formula

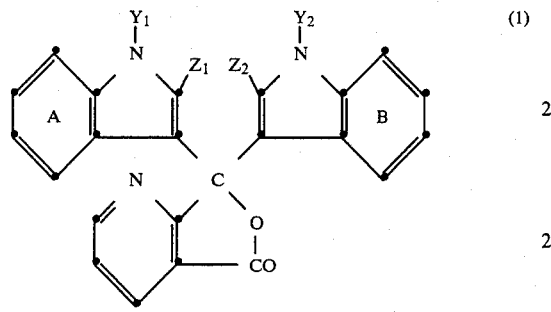

(1)

wherein $Y_1$ is hydrogen, $C_1$–$C_{12}$alkyl which is unsubstituted or substituted by halogen, hydroxyl, cyano or lower alkoxy, or is $C_1$–$C_{12}$acyl, benzyl or benzyl substituted by halogen, nitro, lower alkyl or lower alkoxy, $Y_2$ is $C_5$–$C_{12}$alkyl, preferably $C_6$–$C_9$alkyl, which is unsubstituted or substituted by halogen, hydroxyl, cyano or lower alkoxy, and $Z_1$ and $Z_2$, each independently of the other, are hydrogen, lower alkyl or phenyl, and the rings A and B, each independently of the other, are unsubstituted or substituted by halogen, nitro, cyano, lower alkyl, lower alkoxy, lower alkoxycarbonyl, amino, mono-lower alkylamino or di-lower alkylamino.

In the definition of the radicals of the azaphthalides (dihydrofuropyridinones), lower alkyl and lower alkoxy normally denote those groups of moieties which contain 1 to 5, preferably 1 to 3, carbon atoms. Alkyl groups may be methyl, ethyl, n-propyl, isopropyl, n-butyl, sec-butyl or amyl, and alkoxy may be methoxy, ethoxy or isopropoxy.

Acyl is preferably formyl, lower alkylcarbonyl, e.g. acetyl or propionyl, or benzoyl. Further acyl radicals may be lower alkylsulfonyl, e.g. methylsulfonyl or ethylsulfonyl and phenylsulfonyl. Benzoyl and phenylsulfonyl may be substituted by halogen, methyl, methoxy or ethoxy.

An alkyl group $Y_1$ may be straight chain or branched. Examples of such alkyl groups are: methyl, ethyl, n-propyl, isopropyl, n-butyl, sec-butyl, amyl, n-hexyl, 2-ethylhexyl, n-heptyl, n-octyl, isooctyl, n-nonyl, isononyl or n-dodecyl.

$Y_1$ as substituted alkyl is preferably cyanoalkyl, haloalkyl, hydroxyalkyl, alkoxyalkyl, each containing preferably a total of 2 to 4 carbon atoms, e.g. β-cyanoethyl, β-chloroethyl, β-hydroxyethyl, β-methoxyethyl or β-ethoxyethyl.

Preferred substituents of the benzyl group $Y_1$ are halogen atoms, methyl or methoxy. Examples of such substituted benzyl radicals are p-methylbenzyl, o- or p-chlorobenzyl or p-methoxybenzyl.

The higher alkyl radical $Y_2$ may be amyl, n-hexyl, 2-ethylhexyl, n-heptyl, n-octyl, isooctyl, tert-octyl, n-nonyl, isononyl, n-decyl or n-dodecyl.

The N-substituents $Y_1$ and $Y_2$ are each preferably $C_6$–$C_9$alkyl, e.g. n-hexyl, n-heptyl, n-nonyl or, most preferably, n-octyl.

Each of $Z_1$ and $Z_2$ is preferably phenyl or, most preferably, each is methyl.

The rings A and B are preferably not further substituted.

Useful 4-azaphthalides of this invention are those of the formula

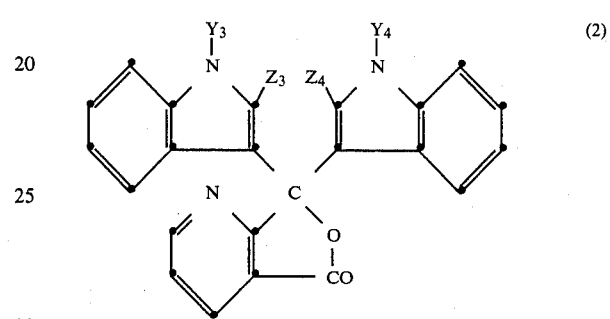

(2)

wherein $Y_3$ is hydrogen, $C_1$–$C_9$alkyl, acetyl, propionyl, benzyl or benzyl substituted by halogen, methyl or methoxy, $Y_4$ is $C_6$–$C_9$alkyl, preferably n-octyl, and $Z_3$ and $Z_4$ are each independently phenyl or, preferably, methyl.

Halogen in the definition of the substituents in formulae (1) and (2) is for example fluorine, bromine or, preferably, chlorine.

Preferred 4-azaphthalides of the formula (2) are those in which $Y_3$ is $C_6$–$C_9$alkyl and, in particular, n-octyl.

The most preferred 3,3-bisindolyl-4-azaphthalides are those of the formula

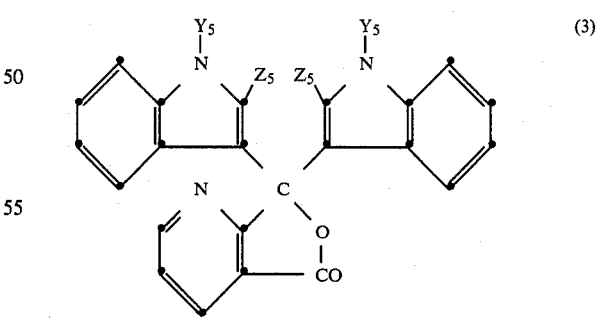

(3)

wherein $Y_5$ is n-hexyl or preferably n-octyl, and $Z_5$ is phenyl or preferably methyl.

The 4-azaphthalides of the formulae (1) to (3) are novel compounds and can be prepared by methods which are known per se. One process for the preparation of the azaphthalides of the formula (1) comprises reacting a compound of the formula

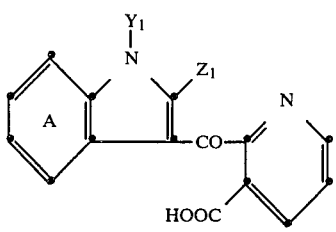

with a compound of the formula

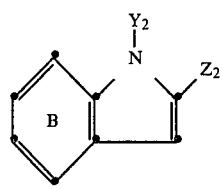

wherein A, B, $Y_1$, $Y_2$, $Z_1$ and $Z_2$ have the given meanings.

Another process for obtaining the azaphthalides of this invention comprises reacting a compound of the formula

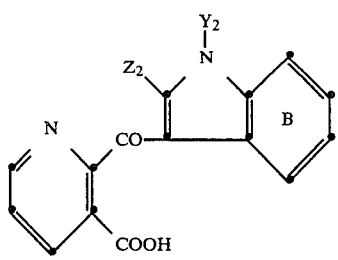

with an indole compound of the formula

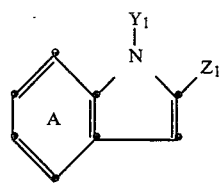

wherein A, B, $Y_1$, $Y_2$, $Z_1$ and $Z_2$ have the given meanings.

The reactions are carried out such that the reactants are reacted in the presence of an acid condensing agent in the temperature range from 20° to 140° C. Examples of such condensing agents are sulfuric acid, zinc chloride, phosphoric acid, phosphoroxy chloride and, preferably, acetic anhydride.

When the reaction is complete, the pH of the reaction mixture is adjusted to at least 6. The adjustment is conveniently made with an alkali, e.g. an alkali metal hydroxide such as sodium or potassium hydroxide, ammonia, or an alkali metal carbonate or bicarbonate, or with a mixture of such compounds. It is preferred to adjust the pH to 7 to 11.

The final product of the formula (1) is isolated in known manner by filtering off the precipitate and washing and drying it, or by treating it with suitable organic solvents, e.g. ligroin, methanol or isopropanol, from which the product is preferably recrystallised.

The starting materals of the formulae (4) and (6) are usually obtained by reacting quinolinyl anhydride with an indole compound of the formula (7) or (5), if desired in an organic solvent and optionally in the presence of an inorganic or organic metal salt of a polyvalent metal, e.g. zinc chloride or aluminium chloride. Examples of suitable solvents are dimethylformamide, acetonitrile, lower aliphatic carboxylic acids such as acetic acid or propionic acid, benzene, toluene, xylene or chlorobenzene. It is preferred to carry out the reaction in the temperature range from 15° C. to the boiling point of the solvent employed. The compounds of the formula (4) or (6) can be further used, without being isolated, for reaction with the indole compound of the formula (5) or (7). The resultant ketonic acids of the formulae (4) and (6) will preferably be recrystallised e.g. from the suitable organic solvents mentioned above.

The azaphthalides of the formula (1) to (3) are normally colourless or, at most, faintly coloured. When these colour formers are brought into contact preferably with an acid developer, e.g. an electron acceptor, they produce strong red or violet shades of excellent fastness to sublimation and light. They are therefore also very useful when combined with one or more other known colour formers, for example 3,3-(bis-aminophenyl)phthalides, 3,3-(bis-indolyl)phthalides, 3-aminophenyl-3-indolylazaphthalides, 3-aminofluoranes, 2,6-diaminofluoranes, leucoauramines, spiropyranes, spirodipyranes, chromenoindoles, chromenopyrazoles, phenoxazines, phenothiazines, quinazolines, bisquinazolines, carbazolylmethanes or other triarylmethaneleuco dyes, to give blue, navy blue, grey or black colorations.

The azaphthalides of the formulae (1) to (3) exhibit both on activated clays, and especially on phenolic substrates, an improved colour intensity and lightfastness. They are suitable in particular as rapidly developing colour formers for use in a heat-sensitive, or especially in a pressure-sensitive, recording material which can also be a copying material. They are distinguished by the property that they develop only insignificantly on base paper.

A pressure-sensitive material consists, for example, of at least one pair of sheets which contain at least one colour former of the formulae (1) to (3) dissolved in an organic solvent, and a solid electron acceptor as developer.

Typical examples of such developers are activated clays such as attapulgite, acid clay, bentonite, montmorillonite, activated clay, e.g. acid-activated bentonite or montmorillonite, and also zeolith, halloysite, silica, alumina, aluminium sulfate, aluminium phosphate, zinc chloride, activated kaolin or any clay. Preferred developers are acidic organic compounds, for example unsubstituted or ring-substituted phenols, salicylic acid or salicylates and their metal salts, or an acidic polymer, for example a phenolic polymer, an alkylphenol acetylene resin,, a maleic acid/rosin resin or a partially or completely hydrolysed polymer of maleic acid and styrene, ethylene or vinyl methyl ether, or carboxypolymethylene. Mixtures of these polymers can also be used. Particularly preferred developers are zinc salicylates or the condensation products of p-substituted phenols with formaldehyde. These latter may also contain zinc.

The developers may also be used with other basically inert or almost inert pigments. Examples of such pigments are: talcum, titanium dioxide, zinc oxide, chalk, clays such as kaolin, as well as organic pigments, e.g. urea/formaldehyde or melamine/formaldehyde condensates.

The colour former effects a coloured marking at those points where it comes into contact with the electron acceptor. In order to prevent the colour formers contained in the pressure-sensitive recording material from becoming active prematurely, they are usually separated from the electron acceptor. This separation can conveniently be accomplished by incorporating the colour formers in foamlike, spongelike or honeycomb-like structures. The colour formers are preferably encapsulated in microcapsules, which as a rule can be ruptured by pressure.

When the capsules are ruptured by pressure, for example with a pencil, the colour former solution is transferred to an adjacent sheet which is coated with an electron acceptor and a coloured area is thus produced. This colour results from the dye which is formed and which is absorbed in the visible range of the electromagnetic spectrum.

The colour formers are encapsulated preferably in the form of solutions in organic solvents. Examples of suitable solvents are preferably non-volatile solvents, for example a polyhalogenated paraffin, such as chloroparaffin, or a polyhalogenated diphenyl, such as monochlorodiphenyl or trichlorodiphenyl, and also tricresyl phosphate, di-n-butyl phthalate, dioctyl phthalate, trichlorobenzene, trichloroethylphosphate, an aromatic ether such as benzylphenyl ether, a hydrocarbon oil such as paraffin or kerosene, an alkylated (e.g. with isopropyl, isobutyl, sec- or tert-butyl) derivative of diphenyl, diphenylalkane, naphthalene or terphenyl; dibenzyl toluene, terphenyl, partially hydrogenated terphenyl, a benzylated xylene, or other chlorinated or hydrogenated, condensed aromatic hydrocarbons. Mixtures of different solvents, especially mixtures of paraffin oils or kerosene and diisopropylnaphthalene or partially hydrogenated terphenyl, are often used in order to obtain an optimum solubility for the colour formation, a rapid and intense coloration, and a viscosity which is advantageous for the microencapsulation. When encapsulated, the 3,3-bisindolyl-4-azaphthalides are distinguished by exceedingly good pH stability.

The capsules walls can be formed evenly around the droplets of the colour former solution by coacervation; and the encapsulating material can consist of gelatin and gum arabic, as described e.g. in U.S. Pat. No. 2 800 457. The capsules can also be formed preferably from an aminoplast or a modified aminoplast by polycondensation, as described in British patent specification Nos. 989 264, 1 156 725, 1 301 052 and 1 355 124. Also suitable are microcapsules which are formed by interfacial polymerisation, e.g. capsules formed from polyester, polycarbonate, polysulfonamide, polysulfonate, but in particular from polyamide or polyurethane.

The microcapsules containing the colour formers of the formulae (1) to (3) can be used for the production of a wide variety of known kinds of pressure-sensitive copying material. The various systems differ substantially from one another in the arrangement of the capsules, of the colour reactants, and of the support. A preferred arrangement is that in which the encapsulated colour former is in the form of a layer on the back of a transfer sheet and the developer is in the form of a layer on the face of a receiver sheet.

Another arrangement of the components is that wherein the microcapsules which contain the colour former, and the developer, are in or on the same sheet, in the form of one or more individual layers, or are present in the paper pulp.

The capsules are preferably secured to the support by means of a suitable adhesive. As paper is the preferred support, these adhesives are principally paper-coating agents, for example gum arabic, polyvinyl alcohol, hydroxymethylcellulose, casein, methyl cellulose, dextrin, starch or starch derivatives or polymer latices. These latter are e.g. butadiene/styrene copolymers or acrylic homopolymers or copolymers.

The paper employed comprises not only normal paper made from cellulose fibres, but also paper in which the cellulose fibres are replaced (partially or completely) by synthetic polymers.

The compounds of the formulae (1) to (3) can also be employed as colour formers in a thermoreactive recording material. This recording material usually contains at least one carrier, one colour former, one electron acceptor and, optionally, also a binder.

Thermoreactive recording systems comprise, for example, heat-sensitive recording or copying materials or papers. These systems are used e.g. for recording information, for example in electronic computers, teleprinters or telewriters, or in recording and measuring instruments, e.g. electrocardiographs. The image (mark) information can also be effected manually with a heated pen. Laser beams can also be used to produce heat-induced marks.

The thermoreactive recording material can be composed such that the colour former is dispersed or dissolved in one binder layer and the developer is dissolved or dispersed in the binder in a second layer.

Another possibility comprises in dispersing both the colour former and the developer in one layer. By means of heat the binder is softened at specific areas and the colour former comes into contact with the developer (electron acceptor) at those points where heat is applied and the desired colour develops at once.

Suitable developers are the same electron acceptors as are used in pressure-sensitive papers. Examples of developers are the clays already mentioned and especially phenolic resins, or also the phenolic compounds described e.g. in German Offenlegungsschrift No. 1 251 348, for example 4-tert-butylphenol, 4-phenylphenol, 4-hydroxydiphenyl ether, α-naphthol, β-naphthol, methyl 4-hydroxybenzoate, 4-hydroxyacetophenone, 2,2'-dihydroxydiphenyl, 4,4'-isopropylidenediphenol, 4,4'-isopropylidene-bis-(2-methylphenol), 4,4'-bis-(hydroxyphenyl) valeric acid, hydroquinone, pyrogallol, phloroglucinol, p-, m- and o-hydroxybenzoic acid, gallic acid, 1-hydroxy-2-naphthoic acid, as well as boric acid or organic, preferably aliphatic, dicarboxylic acids, for example tartaric acid, oxalic acid, maleic acid, citric acid, citraconic acid or succinic acid.

Fusible, film-forming binders are preferably used for the manufacture of the thermoreactive recording material. These binders are normally water-soluble, whereas the azaphthalides and the developer are sparingly soluble or insoluble in water. The binder should be able to disperse and fix the colour former and the developer at room temperature.

By applying heat the binder softens or melts, so that the colour former comes in contact with the developer and a colour is able to form. Examples of binders which are soluble, or at least swellable, in water are e.g. hydrophilic polymers, for example polyvinyl alcohol, polyacrylic acid, hydroxyethylcellulose, methyl cellulose, carboxmethylcellulose, polyacrylamide, polyvinyl pyrrolidone, gelatin, starch, or etherified corn starch.

If the colour former and the developer are in two separate layers, it is possible to use water-insoluble binders, i.e. binders which are soluble in non-polar or only weakly polar solvents, for example natural rubber, synthetic rubbers, chlorinated rubber, alkyd resins, polystyrene, styrene/butadiene copolymers, polymethylacrylates, ethyl cellulose, nitrocellulose or polyvinyl carbazole. The preferred arrangement, however, is that in which the colour former and the developer are contained in one layer in a water-soluble binder.

The thermoreactive coatings may contain further ingredients. To improve the degree of whiteness, to facilitate the printing of papers, and to prevent the heated pen from sticking, the coatings may contain e.g. talcum, titanium dioxide, zince oxide, aluminium hydroxide, calcium carbonate (e.g. chalk), clays or also organic pigments, for example urea/formaldehyde polymers. In order to effect the colour formation only within a limited temperature range, it is possible to add substances such as urea, thiourea, diphenyl thiourea, acetamide, acetanilide, stearyl amide, phthalic anhydride, metal stearates, dimethyl terephthalate, phthalonitrile or other appropriate fusible products which induce the simultaneous melting of the colour former and the developer. Thermographic recording materials preferably contain waxes, e.g. carnauba wax, montan wax, paraffin wax, polyethylene wax, condensates of higher fatty acid amides and formaldehyde, or condensates of higher fatty acids and ethylenediamine.

The invention is illustrated by the following Examples, in which percentages are by weight, unless otherwise indicated.

EXAMPLE 1

9.8 g of 2-(N-octyl-2'-methylindol-3'-yl)carbonylnicotinic acid and 7.0 g of N-octyl-2-methylindole are stirred for 2 hours at 60°-65° C. in 50 ml of acetic anhydride. The reaction mixture is then cooled to room temperature and poured into 100 ml of water. Then 100 ml of 30% aqueous ammonia are added. The resultant suspension is stirred for 2 hours and the product is then isolated by filtration, washed with water and dried in vacuo at 70°-80° C. Recrystallisation of the crude product from ligroin yields 11.6 g (75% of theory) of the compound of the formula

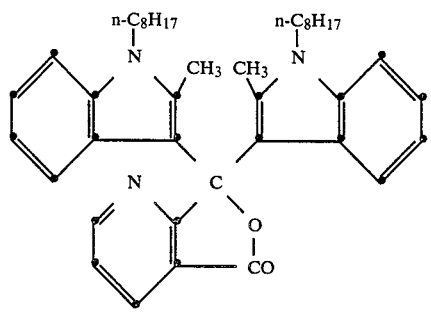

(11)

with a melting point of 128°-129° C. This colour former develops a violet shade on phenolic resin.

Compared with the known 3,3-bis-(N-ethyl-2'-methylindol-3'-yl)-4-azaphthalide, the compound of formula (11) has much better properties with respect to development on base paper and a much better pH stability. The 3,3-bisindolyl-4-azaphthalides of the formula

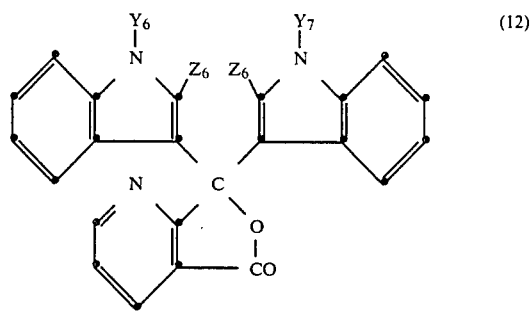

(12)

listed in the following Table are obtained in the same manner as described in this Example using the appropriate starting materials.

TABLE

| Example | $Y_6$ | $Z_6$ | $Y_7$ | m.p./°C. | Colour on phenolic resin |
|---|---|---|---|---|---|
| 2 | n-$C_6H_{13}$ | —$CH_3$ | n-$C_6H_{13}$ | 126–127 | violet |
| 3 | n-$C_5H_{11}$ | —$CH_3$ | n-$C_5H_{13}$ | 129–130 | violet |
| 4 | n-$C_8H_{17}$ | —$CH_3$ | —$CH_3$ | 179–181 | violet |
| 5 | n-$C_9H_{19}$ | —$CH_3$ | n-$C_9H_{19}$ | 100–101 | violet |

Preparation of a pressure-sensitive copying paper

EXAMPLE 6

A solution of 3 g of the 3,3-bisindolyl-4-azaphthalide of the formula (11) obtained in Example 1 in 80 g of diisopropylnaphthalene and 17 g of kerosene are microencapsulated by coacervation in a manner known per se with gelatin and gum arabic. The microcapsules are mixed with starch solution and coated on a sheet of paper. The face of a second sheet of paper is coated with phenolic resin as colour developer. The first sheet and the sheet coated with the developer are laid on top of each other with the coated sides face to face. Pressure is exerted on the first sheet by writing by hand or typewriter and a strong violet copy of excellent lightfastness develops immediately on the sheet coated with the developer. Strong and lightfast violet copies are also obtained by using any of the other colour formers indicated in Examples 2 to 5.

EXAMPLE 7

1 g of the 3,3-bisindolyl-4-azaphthalide of the formula (11) is dissolved in 17 g o of toluene. With stirring, 12 g of polyvinyl acetate, 8 g of calcium carbonate and 2 g of titanium dioxide are added to this solution. The resultant suspension is diluted with toluene in the weight ratio 1:1 and applied to a sheet of paper with a knife to a thickness of 10 μm. On this sheet of paper is laid a secon sheet, the undeside of which has been coated to a weight of 3 g/m² with a mixture consisting of 1 part of an amide wax, 1 part of a stearin wax and 1 part of zinc chloride. Pressure is exerted on the top sheet by hand or typewriter and a strong and lightfast violet copy develops immediate on the sheet coated with the colour former.

EXAMPLE 8

A solution of 0.6 g of the 3,3-bisindolyl-4-azaphthalide of the formula (11) and 2.4 g of the 3-(4'-diethylamino-2'-ethoxyphenyl)-3-(N-n-octyl-2''-methylindol-3''-yl)-4-azaphthalide compound in 80 g of diisopropyl naphthalene and 17 g of kerosene is microencapsulated by coacervation in a manner known per se with gelatin and gum arabic. The microcapsules are mixed with starch solution and the mixture is coated on a sheet of paper. The face of a second sheet of paper is coated with phenolic resin as colour developer. The first sheet and the sheet coated with the developer are laid on top of each other with the the coated sides face to face. Pressure is exerted on the first sheet by writing by hand or typewriter and a strong bluish red colour of excellent lightfastness develops immediately on the sheet coated with the developer.

Preparation of a heat-sensitive recording material

EXAMPLE 9

In a ball mill, 32 g of 4,4'-isopropylidenediphenol (bisphenol A), 3.8 g of the distearylamide of ethylenediamine, 39 g of kaolin, 20 g of an 88% hydrolysed polyvinyl alcohol and 500 ml of water are ground to particle size of about 5 μm. In a second ball mill, 6 g of the 3,3-bisindolyl-4-azaphthalide of the formula (11) obtained in Example 1, 3 g of a 88% hydrolysed polyvinyl alcohol and 60 ml of water are ground to a particle size of about 3 μm. Both dispersions are mixed and applied to paper to a dry coating weight of 5.5 g/m². A strong violet colour of excellent fastness to light and sublimation is produced by contacting the paper with a heated ball-point pen. Strong and lightfast violet copies can also be obtained by using any of the other colour formers obtained in Examples 2 to 5.

EXAMPLE 10

In a ball mill, 2.7 g of the 3,3-bisindolyl-4-azaphthalide of the formula (11), 24 g of N-phenyl-N'-(1-hydroxy-2,2,2-trichloroethyl)-urea, 16 g of stearylamide, 59 g of an 88% hydrolysed polyvinyl alcohol and 58 ml of water are ground to a particle size of 2–5 μm. This suspension is applied to a sheet of paper to a dry coating weight of 5.5 g/m². A strong and lightfast violet colour is obtained by contacting the paper with a heated ball-point pen.

What is claimed is:

1. A pressure-sensitive or heat-sensitive recording material which comprises a support which contains, or on which is coated, at least one 3,3-bisindolyl-4-azaphthalide of the formula

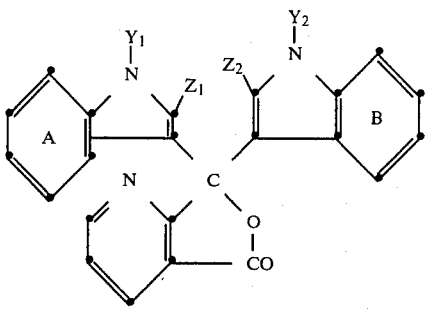

wherein $Y_1$ is hydrogen, $C_1$–$C_{12}$alkyl which is unsubstituted or substituted by halogen, hydroxyl, cyano or lower alkoxy, or is $C_1$–$C_{12}$acyl, benzyl or benzyl substituted by haogen, nitro, lower alkyl or lower alkoxy, $Y_2$ is $C_6$–$C_9$alkyl, which is unsubstituted or substituted by halogen, hydroxyl, cyano or lower alkoxy, and $Z_1$ and $Z_2$, each independently of the other, are hydrogen, lower alkyl or phenyl, and the rings A and B, each independently of the other, are unsubstituted or substituted by halogen, nitro, cyano, lower alkyl, lower alkoxy, lower alkoxycarbonyl, amino, mono-lower alkylamino or di-lower alkylamino.

2. The pressure-sensitive recording material of claim 1, wherein the 3,3-bisindolyl-4-azaphthalide is dissolved in an organic solvent, and which recording material further comprises at least one solid electron acceptor.

3. The pressure-sensitive recordng material of claim 2, wherein the 3,3-bisindolyl-4-azaphthalide is encapsulated in microcapsules.

4. The pressure-sensitive recording material of claim 3, wherein the encapsulated 3,3-bisindolyl-4-azaphthalide is present in the fom of a layer on the back of a transfer sheet and the electron acceptor is present in the form of a layer on the face of a receiving sheet.

5. The pressure-sensitive recording material of claim 1, which comprises the 3,3-bisindolyl-4-azaphthalide together with one or more other color formers.

6. The heat-sensitive recording material of claim 1, which comprises in at least one layer, at least one 3,3-bisindolyl-4-azaphthalide color former, at least one electron acceptor and at least one binder.

* * * * *